(12) United States Patent
Zhang et al.

(10) Patent No.: US 10,828,565 B2
(45) Date of Patent: Nov. 10, 2020

(54) CROSS-PLATFORM GAME BATTLE METHOD AND APPARATUS, TERMINAL, AND SYSTEM

(71) Applicant: TENCENT TECHNOLOGY (SHENZHEN) COMPANY LIMITED, Shenzhen, Guangdong (CN)

(72) Inventors: Jun Zhang, Shenzhen (CN); Yipeng Zhao, Shenzhen (CN); Luxi Chen, Shenzhen (CN); Mingwei Zhang, Shenzhen (CN); Yunhui Yuan, Shenzhen (CN); Xin Zhou, Shenzhen (CN); Jianyang Wei, Shenzhen (CN); Yulin Huang, Shenzhen (CN); Jiaxing Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 42 days.

(21) Appl. No.: 16/006,437

(22) Filed: Jun. 12, 2018

(65) Prior Publication Data
US 2018/0290053 A1 Oct. 11, 2018

Related U.S. Application Data

(63) Continuation of application No. PCT/CN2017/085050, filed on May 19, 2017.

(30) Foreign Application Priority Data

Jun. 7, 2016 (CN) .......................... 2016 1 0399158

(51) Int. Cl.
*A63F 13/48* (2014.01)
*A63F 13/35* (2014.01)
(Continued)

(52) U.S. Cl.
CPC .............. *A63F 13/48* (2014.09); *A63F 13/31* (2014.09); *A63F 13/335* (2014.09); *A63F 13/35* (2014.09);
(Continued)

(58) Field of Classification Search
None
See application file for complete search history.

(56) References Cited

U.S. PATENT DOCUMENTS 7,828,661 B1 * 11/2010 Fish ........................ A63F 13/87
463/42
9,604,130 B1 * 3/2017 Ayyar ..................... A63F 13/63
(Continued)

FOREIGN PATENT DOCUMENTS

| CN | 101155044 A | 4/2008 |
|---|---|---|
| CN | 101075941 B | 1/2011 |

(Continued)

OTHER PUBLICATIONS https://jingyan.baidu.co20160131m/article/295430f1c7eb930c7e0050bc.html., May 8, 2018, No. 4-10.
(Continued)

*Primary Examiner* — Jason T Yen
(74) *Attorney, Agent, or Firm* — Sughrue Mion, PLLC

(57) ABSTRACT

A cross-platform game battle method and apparatus, a terminal, and a system are provided. The method includes sending a first request to a game server in response to a first operation, with respect to a game, on a first web page. A first response is received in response to the first request, and a game address is obtained according to the first response. The game address is sent to a second terminal, the game address being usable by the second terminal to obtain a second web page to start the game. The second terminal is on a platform that is different from a platform of the first web page.

13 Claims, 14 Drawing Sheets

(51) Int. Cl.
*H04L 29/06* (2006.01)
*H04L 29/08* (2006.01)
*A63F 13/795* (2014.01)
*A63F 13/87* (2014.01)
*A63F 13/335* (2014.01)
*A63F 13/352* (2014.01)
*H04N 21/478* (2011.01)
*A63F 13/31* (2014.01)
*A63F 13/537* (2014.01)
*A63F 13/71* (2014.01)
*A63F 13/843* (2014.01)
*H04L 12/58* (2006.01)

(52) U.S. Cl.
CPC .......... *A63F 13/352* (2014.09); *A63F 13/795* (2014.09); *A63F 13/87* (2014.09); *H04L 67/125* (2013.01); *H04L 67/38* (2013.01); *H04N 21/4781* (2013.01); *A63F 13/537* (2014.09); *A63F 13/71* (2014.09); *A63F 13/843* (2014.09); *A63F 2300/204* (2013.01); *A63F 2300/308* (2013.01); *A63F 2300/402* (2013.01); *A63F 2300/572* (2013.01); *A63F 2300/8029* (2013.01); *H04L 51/046* (2013.01); *H04L 67/02* (2013.01)

(56) References Cited

U.S. PATENT DOCUMENTS

| | | | |
|---|---|---|---|
| 2002/0086732 A1 | 7/2002 | Kirmse et al. | |
| 2007/0123353 A1* | 5/2007 | Smith | A63F 13/12 463/42 |
| 2014/0128155 A1* | 5/2014 | Morioka | A63F 13/12 463/29 |
| 2014/0128163 A1* | 5/2014 | Almog | A63F 13/12 463/42 |
| 2015/0024848 A1* | 1/2015 | Ino | A63F 13/822 463/42 |
| 2015/0127440 A1* | 5/2015 | Ito | G06Q 30/0257 705/14.16 |
| 2015/0231496 A1* | 8/2015 | Yang | A63F 13/87 463/31 |
| 2015/0350895 A1* | 12/2015 | Brander | H04L 51/04 455/411 |
| 2016/0096110 A1* | 4/2016 | Decoufle | A63F 13/35 463/29 |
| 2016/0107084 A1* | 4/2016 | Kuri | A63F 13/332 463/42 |
| 2016/0261647 A1* | 9/2016 | Yerli | H04L 51/32 |
| 2016/0352851 A1* | 12/2016 | Eriksson | H04L 61/1511 |
| 2017/0296929 A1* | 10/2017 | Chandrasekaran | A63F 13/795 |

FOREIGN PATENT DOCUMENTS

| | | |
|---|---|---|
| CN | 103327109 A | 9/2013 |
| CN | 104702696 A | 6/2015 |
| CN | 104941181 A | 9/2015 |
| CN | 105194874 A | 12/2015 |
| CN | 106075904 A | 11/2016 |
| KR | 10-2015-0012327 A | 2/2015 |

OTHER PUBLICATIONS

Office Action for corresponding CN 20161039158.X, dated May 18, 2018.

International Search Report for PCT/CN2017/085050, dated Aug. 22, 2017.

* cited by examiner

CROSS-PLATFORM GAME BATTLE METHOD AND APPARATUS, TERMINAL, AND SYSTEM

CROSS-RELATED REFERENCE TO RELATED APPLICATIONS

This application is a continuation of International Application, PCT/CN2017/085050, filed on May 19, 2017, in the Chinese Patent Office, which claims priority to Chinese Patent Application No. 201610399158.X, entitled "CROSS-PLATFORM GAME BATTLE METHOD AND APPARATUS, TERMINAL, AND SYSTEM", filed on Jun. 7, 2016, in the Chinese Patent Office, the disclosures of which are incorporated by reference in their entireties.

FIELD

This application relates to the communications field and in particular, to a cross-platform game battle method and apparatus, a terminal, and a system.

BACKGROUND

In recent years, online games develop fast, all kinds of games emerge one after another, and modes and patterns for games renovate. Development of current online games gradually tends to make the architecture enlarged and more complex and pay more attention to social experience of players and interaction between players. Player Versus Player (PVP) refers to a battle between players in an online game. As a traditional game manner in online games, the PVP game manner can greatly improve game experience of players.

Currently, when two parties of players in an online game are engaged in a real-time battle, after a player A logs in to a game on a terminal, the player A can invite only game players in the game for a battle and cannot invite friends of the player A on another social platform for a battle. Consequently, this reduces interaction and fun of the game.

SUMMARY

One or more exemplary embodiments provide a cross-platform game battle method and apparatus, a terminal, and a system, so as to communicate with a user across different platforms (e.g., invite friends on a first platform from a first platform) to engage in a battle game without requiring the user to register with the second platform, thereby greatly reducing a threshold for engaging in a game of players.

According to an aspect of an exemplary embodiment, there is provided a cross-platform game battle method performed by a first terminal, comprising: sending a first request to a game server in response to a first operation, with respect to a game, on a first web page; receiving a first response in response to the first request, and obtaining a game address according to the first response; and sending the game address to a second terminal, the game address being usable by the second terminal to obtain a second web page to start the game, the second terminal being on a platform that is different from a platform of the first web page.

According to another aspect of an exemplary embodiment, there is provided a cross-platform game battle method, including: sending, by a first terminal, a first request to a game server in response to a first operation, with respect to a game, on a first web page; receiving, by the first terminal, a first response in response to the first request, and obtaining a game address according to the first response, the game address being usable by a second terminal to obtain a second web page to start the game; generating and displaying, by the first terminal according to the game address, an identifier for representing the game address; and in response to a user operation, scanning by the second terminal, the identifier for representing the game address displayed on the first terminal, to obtain the game address, the second terminal being on a platform that is different from a platform of the first web page.

According to still another aspect of an exemplary embodiment, there is provided a cross-platform game battle apparatus, including: at least one memory configured to store computer program code; and at least one processor configured to access the at least one memory and operate according to the computer program code, the computer program code including: first sending code configured to cause the at least one processor to send a first request to a game server in response to a first operation, with respect to a game, on a first web page; receiving code configured to cause the at least one processor to receive a first response in response to the first request; address obtaining code configured to cause the at least one processor to obtain a game address according to the first response; and second sending code configured to cause the at least one processor to send the game address to a second terminal, the game address being usable by the second terminal to obtain a second web page to start the game, and the second terminal being on a platform that is different from a platform of the first web page.

According to still another aspect of an exemplary embodiment, there is provided a first terminal, including: a processor; a non-volatile memory; a display; and an external communications interface, the display being configured to display a first web page; the non-volatile memory being configured to store one or more computer readable instructions executed by the processor; and the processor being configured to read the one or more computer readable instructions stored in the non-volatile memory, to perform: sending a first request to a game server in response to a first operation, with respect to a game, on the first web page; receiving a first response in response to the first request, and obtaining a game address according to the first response; and sending the game address to a second terminal, the game address being usable by the second terminal to obtain a second web page to start the game; and the second terminal being on a platform that is different from a platform of the first web page.

According to still another aspect of an exemplary embodiment, there is provided a cross-platform game battle system, including: a first terminal; a second terminal; and a game server, the first terminal being configured to: send a first request to the game server in response to a first operation, with respect to a game, on a first web page, the game server being configured to: receive the first request sent by the first terminal and return a first response to the first terminal, the first terminal being configured to: receive the first response returned by the game server and obtain a game address according to the first response; and generate and display, according to the game address, an identifier for representing the game address, the second terminal being configured to, in response to a user operation, scan the identifier for representing the game address displayed on the first terminal, to obtain the game address, and the second terminal being on a platform that is different from a platform of the first web page.

BRIEF DESCRIPTION OF THE DRAWINGS

These and/or other aspects of the disclosure will become apparent and more readily appreciated from the following description of the exemplary embodiments, taken in conjunction with the accompanying drawings, in which:

FIG. 3-1 is a schematic diagram of an implementation process of another cross-platform game battle method according to an exemplary embodiment;

FIG. 3-2 is a schematic diagram of an implementation process that a first user invites a second user for a game battle according to an exemplary embodiment;

FIG. 3-3 is a schematic diagram of an implementation process that a first user waits for a second user to accept a game battle according to an exemplary embodiment;

FIG. 3-4 is a schematic diagram of an implementation process that a second user accepts a game battle and initiates an invitation for another round according to an exemplary embodiment;

FIG. 3-5 is a schematic diagram of an implementation process that a second user waits for a first user to accept a game battle according to an exemplary embodiment;

FIG. 3-6 is a schematic diagram of an implementation process that a first user accepts an invitation for another round according to an exemplary embodiment;

FIG. 3-7 is a schematic diagram of an implementation process that a first user and a second user perform message exchange according to an exemplary embodiment;

FIG. 4 is a schematic diagram of an implementation process that a first user and a second user carry out a cross-platform game battle according to an exemplary embodiment;

FIG. 5-1 is a schematic diagram of an implementation process of a cross-platform game battle method based on a cross-platform game battle system according to an exemplary embodiment;

FIG. 5-2 is a schematic diagram of an implementation process that a second terminal scans a two dimensional code on a first terminal according to an exemplary embodiment;

FIG. 6 is a schematic diagram of a composition of a cross-platform game battle apparatus according to an exemplary embodiment; and FIG. 7 is a schematic diagram of a hardware composition of a first terminal according to an exemplary embodiment.

DETAILED DESCRIPTION

Figure 1:
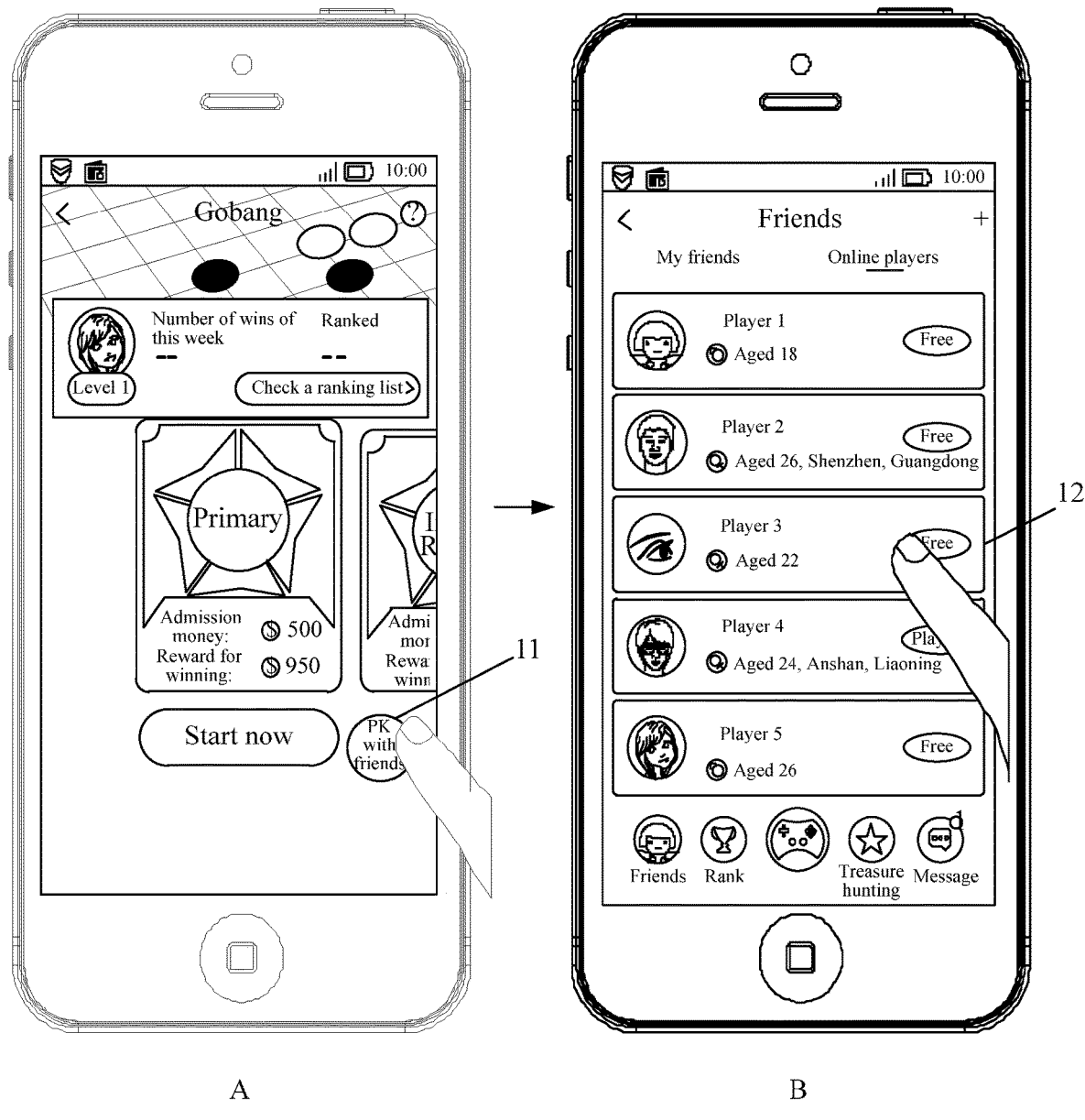
FIG. 1 is a schematic diagram of an invitation process of a real-time battle according to an exemplary embodiment.

A game battle in exemplary embodiments may be a real-time game battle, and an example of a Gobang game is used herein. In exemplary embodiments, a first user opens a game on a first terminal and enters a Gobang game page shown in FIG. 1(A). If the first user wants a real-time battle, the first user may click a "PK with friends" virtual key 11, and the first terminal may jump from a page shown in FIG. 1(A) to a page shown in FIG. 1(B). The first user may view a column 12 in which a user in a "My friends" list or "Online players" list can be selected to play the game with the first user. Users in the "My friend" list and the "Online players" list are referred to as game users on a Gobang game platform herein, and these game users are users that already register on a game server corresponding to the Gobang game.

The first user may select a game user on the Gobang game platform for a battle. After the first user selects the game user, the first terminal may send a battle invitation message including information about the game user to the game server. After receiving the battle invitation message including the information about the game user, the game server may directly and/or indirectly send the battle invitation message to the game user corresponding to information about the game user, and the invited game user may carry out a battle with the first user after accepting the invitation. On the other hand, if a second user is not a game user on the Gobang game platform but is a friend of the first user on another virtual social platform or in reality, the first user cannot obtain user information of the second user in the game server, and therefore, cannot directly send a battle invitation message for inviting the second user for a battle to the game server. That is, the first user cannot invite the second user across platforms for the Gobang game, but can only wait for the second user to register on the game server corresponding to the Gobang game and become a game user, and after obtaining user information of the second user in the game server, invite the second user that is already a game user for a game battle. Consequently, this reduces interaction and fun of the game.

In an exemplary embodiment, based on a web technology, after entering a first web page of the Gobang game shown in FIG. 1A, the first user wants a battle and clicks the "PK with friends" virtual key 11 on the first terminal to begin the game, and then the first terminal obtains a game address corresponding to the game from the game server. Then the first terminal may share the game address to a second user other than game users by various means. For example, the second user is a user associated with the first user on another social platform other than the game platform. If the second user is a friend of the first user in a social application (or social network application), the first user may share the game address to the second user by using the social application. If the second user is a friend of the first user in reality, the first user may invite, by displaying an identifier representing the game address, the second user to use a second terminal to scan the identifier and obtain the game address. After obtaining the game address, the second terminal may obtain from the game server a web page starting the game. In this way, the first user and the second user may carry out a Gobang game battle on the web page of the game, based on an invitation across platforms such that the second user on another platform is invited for a game battle by the first user on the game platform.

The following further describes in detail the technical solutions according to exemplary embodiments with reference to accompanying drawings.

An exemplary embodiment provides a cross-platform game battle method, applied to a first terminal. Functions implemented by the cross-platform game battle method may be implemented by calling, by a processor in the first terminal, program code. Certainly, the program code may be saved in a computer storage medium. It may be learned that the first terminal includes at least the processor and the storage medium. The storage medium is a non-volatile storage medium.

Figure 2:
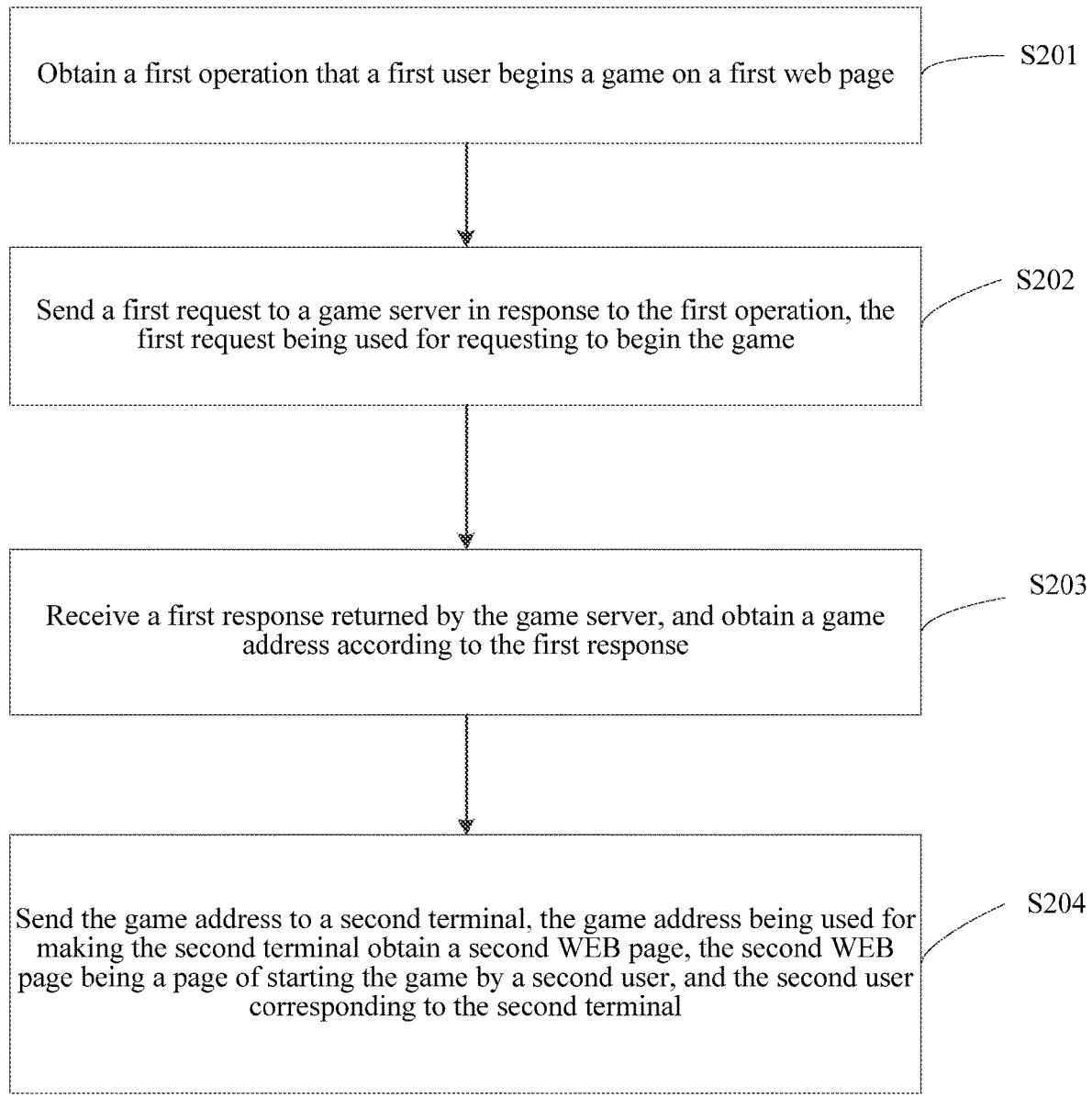
FIG. 2 is a schematic diagram of an implementation process of a cross-platform game battle method according to an exemplary embodiment.

FIG. 2 is a schematic diagram of an implementation process of a cross-platform game battle method according to an exemplary embodiment. As shown in FIG. 2, the cross-platform game battle method includes:

Operation S201: Obtain a first operation that a first user begins a game on a first web page.

The first web page herein may be a game page on a web game or may be a game web page on a mobile game (e.g., an APP game). After the first terminal loads and displays the first web page, a user may perform, by using a finger or a stylus, a touch operation on the first web page displayed on a first terminal screen, and the first operation is an operation that the user requests to begin the game. For example, the first web page may be a Gobang game page in a "Fast play" APP shown in FIG. 1A. When the first user wants to play the Gobang game, the first user may click the "PK with friends" virtual key 11 on the page shown in FIG. 1A, as shown in FIG. 1A, and the click operation is the first operation.

Herein, if the game requires user login, the first user may perform a registration and login operation in a registration and login page of the game, becomes a registered user on a game server corresponding to the game, and logs in to the game. In this way, the first user can enter the first web page to play the game. If the game does not require user login, when the first user requests to load a game web page of the game, the game server automatically allocates a game user name to the first user. In this way, the first user automatically becomes a registered user on the game server, and can directly enter the first web page to play the Gobang game. That is, when controlling the first terminal to enter the first web page, the first user already owns a first game user name on the game server and becomes a user on a game platform.

Operation S202: Send a first request to a game server in response to the first operation, the first request being used for requesting to begin the game.

Herein, after obtaining the first operation, the first terminal may send the first request to the game server in response to the first operation, to request the game server to begin the game of the first user.

Operation S203: Receive a first response returned by the game server, and obtain a game address according to the first response.

Herein, after receiving the first request, the game server begins a game for the first user, and then the game server returns the first response corresponding to the first request to the first terminal.

In an exemplary embodiment, when beginning a game round, the game server carries the game address in the first response and sends the first response to the first terminal. The game address may be an address of a resource that an invited user may use to play the game round in the game server. Because the first response carries the game address, correspondingly, the obtaining a game address according to the first response in operation S203 includes: parsing the first response to obtain the game address.

In an exemplary embodiment, after beginning a game round, the game server allocates a round number to the game round, and the round number corresponds to an address of a resource that an invited user may use to play the game. The first response returned by the game server carries a round number of the game, and the obtaining a game address according to the first response includes: parsing the first response to obtain the round number, and generating the game address according to the round number and a game identification parameter. The game identification parameter may be a parameter, for example, a game server domain name of the game, that makes another terminal access a resource corresponding to the round number in the game server.

Operation S204: Send the game address to a second terminal, the game address being used for making the second terminal obtain a second web page, the second web page being a page of starting the game by a second user, and the second user corresponding to the second terminal.

Herein, the second user is a user other than game users on the first web page, that is, the second user is not a user on the game platform. The second user may be a friend of the first user on another social application, that is, a user on another social application platform, such as a QQ friend, a WeChat friend, and a contact from a contact book. The first user may select the second user that the first user is about to invite from a friend list page of a social application displayed by the first terminal, and then sends, by using an instant messaging page with the second user in the social application, the game address received by the first terminal to the second user. The second user corresponds to the second terminal. In this way, the first terminal may send the game address to the second terminal.

Herein, the first terminal may send, in any effective manner, the game address to the second user that the first user wants to invite.

Herein, the second terminal displays the received game address on the instant messaging page of the first user. When the second user clicks the game address, the second terminal sends the game address to the game server, and obtains from the game server a second game resource to be used by an invitee corresponding to the game address to play the game. The second terminal loads the second game resource to obtain the second web page, and the second web page is a page of starting the game by the second user.

Herein, if the game requires user login, after obtaining a game resource corresponding to the game address, the second terminal may determine, according to the game resource, that the second user may log in to the game. Then, the second terminal may display a login authorization page of the social application. After the second user is authorized to log in, the second terminal may use user information of the second user in the social application as a game user name to log in to the game and load the game resource corresponding to the game address to obtain the second web page. If the game does not require user login, when the second terminal sends the game address to the game server, the game server automatically allocates a game user name to the second user. The second user may automatically become a registered user on the game server. After obtaining the game resource corresponding to the game address, the second terminal may directly load the game resource to obtain the second web page. That is, when displaying the second web page, the second terminal already owns the game user name on the game server.

Herein, after displaying the second web page, the second terminal may send a game acceptance notification to the game server, to notify the game server that the game can start. After receiving the game acceptance notification, the game server sends a game starting notification to the first terminal, and the game starting notification is used for notifying the first user that the second user already accepts an invitation for the game. When receiving the game starting notification, the first terminal obtains a first game resource that the first user may use to start the game, then loads the first game resource to obtain a third web page, and displays the third web page.

Herein, when running the game, the second terminal does not need to download a game client, and may directly display the second web page at a social application client based on a web technology and run the game. The first terminal displays the third web page provided by the game client and runs the game at game client. The second terminal displays the second web page provided by the social application client and runs the game at the social application client. The first user and the second user play the game across platforms. After the first terminal and the second terminal separately display a web page of the game, the first user and the second user may use respective game user names to input game instructions on respective web pages, and carry out a game battle by using the game server.

In an exemplary embodiment, when detecting that the first user is about to carry out a game battle, the first terminal sends the first request to the game server, to request the game server to begin a game, and obtains the game address from the first response returned by the game server. In this way, the first terminal may send the obtained game address to the second user other than game users on the first web page, so that the second terminal of the second user may obtain the page of starting the game according to the game address. In this way, the second user may perform a game operation on the page and carry out a game battle with the first user.

Figures 1, 3:
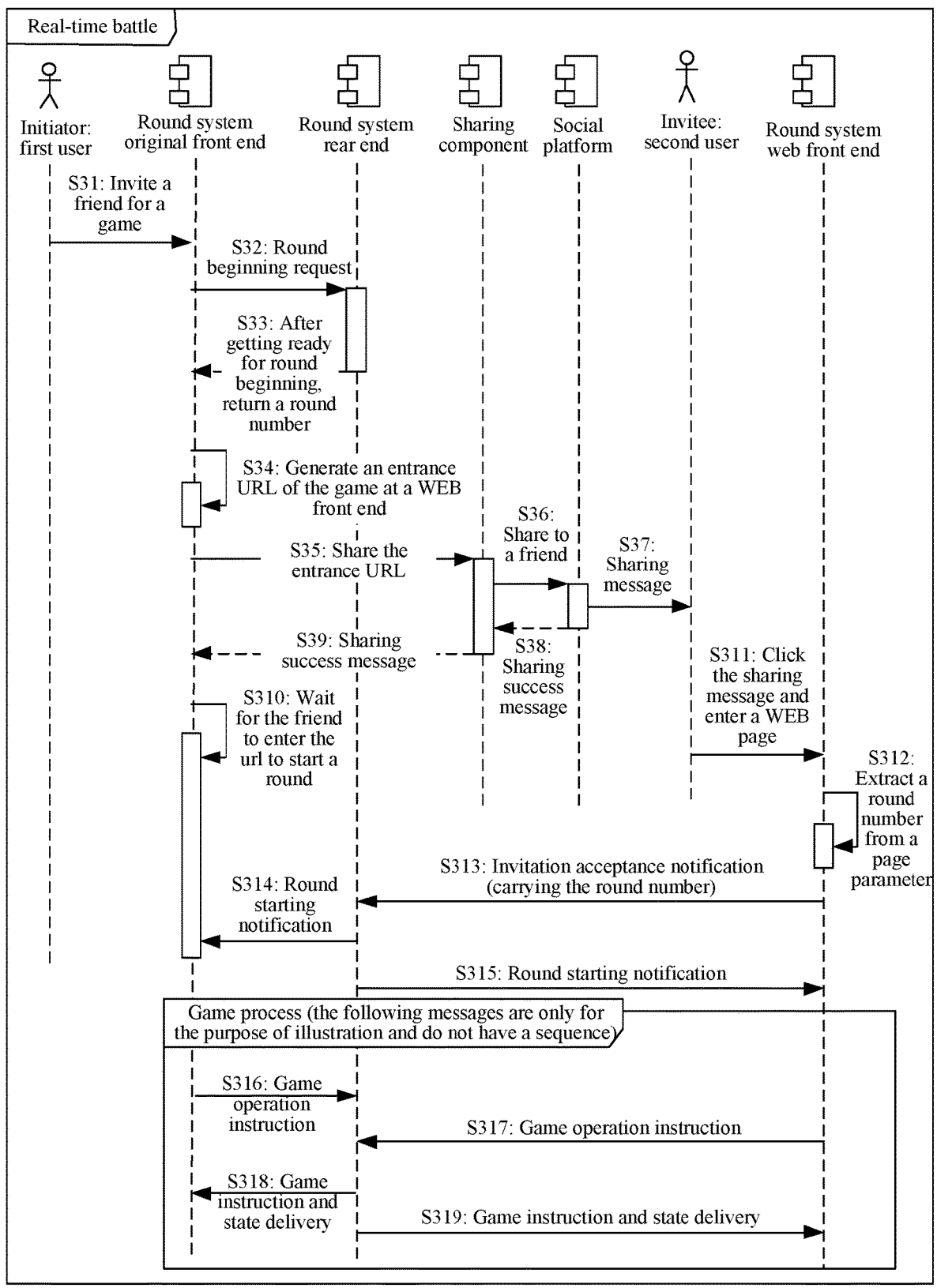
Figures 2, 3:
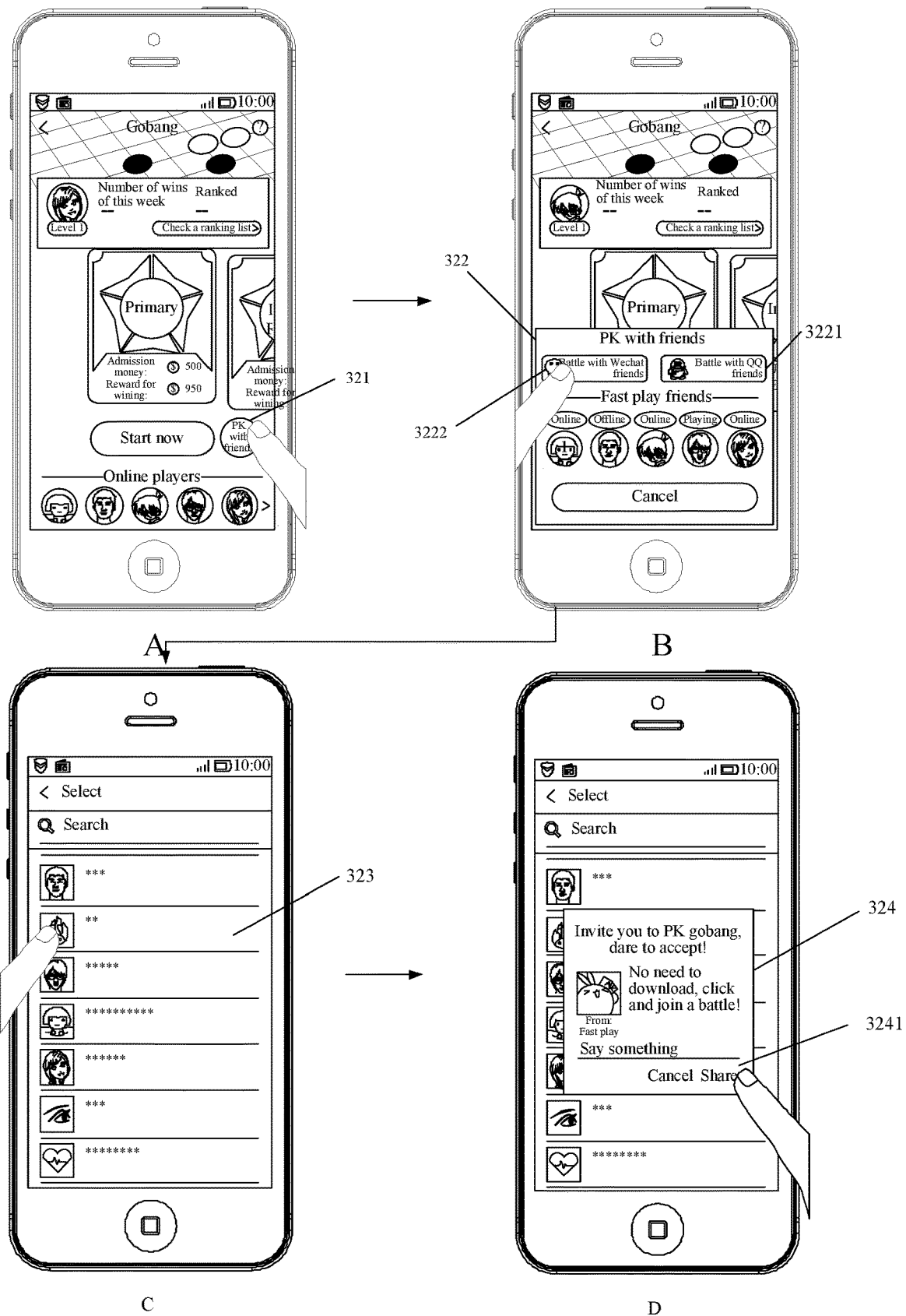
Figure 3:
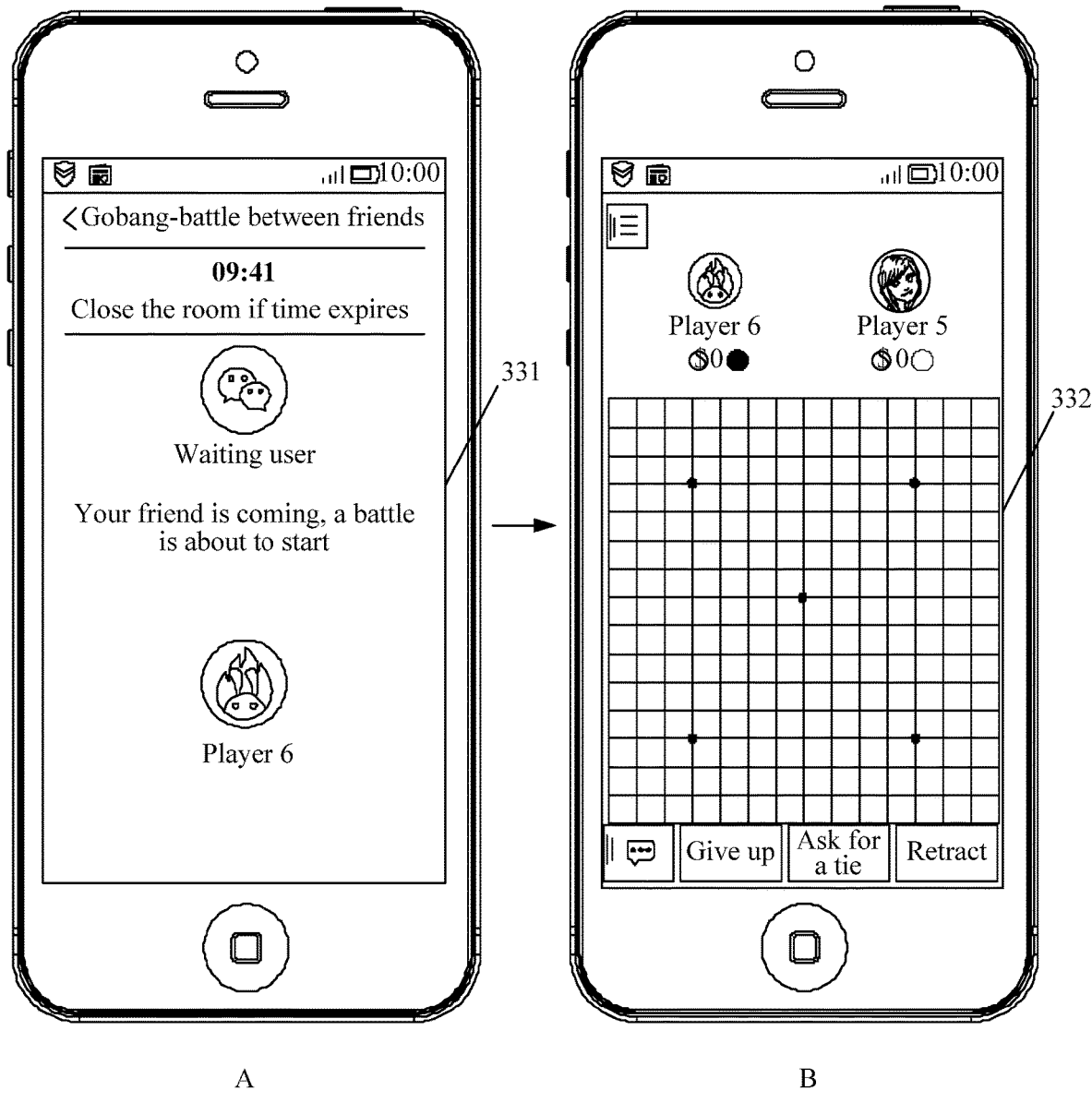

An exemplary embodiment further provides a cross-platform game battle method. As shown in FIG. 3-1, the cross-platform game battle method includes:

Operation S31: A round system original front end detects that a first user invites a friend for a battle.

Herein, the round system original front end is a game client installed on a first terminal. The game client displays a first web page on a display interface of the first terminal, and the first web page may be a page shown in FIG. 3-2(A). The first user, as an initiator, clicks a "PK with friends" virtual key 321 on the first web page, and the game client can detect that the user is about to invite a friend for a battle.

Herein, an operation that the first user clicks the "PK with friends" virtual key 321 is a first operation of beginning a game, and the first terminal may obtain the first operation that the first user begins the game on the first web page.

Operation S32: The round system original front end sends a round beginning request to a round system rear end.

Herein, the round system rear end is a background of the game client, that is, a game server. The round system original front end sends a round beginning request to the round system rear end in response to the first operation, and the round beginning request is a first request used for requesting to begin the game.

Operation S33: After getting ready for round beginning, the round system rear end returns a round number to the round system original front end.

Herein, after receiving the round beginning request, the round system rear end carries out a round beginning service process, begins a game round for the first user, and allocates a round number to the game round. After getting ready for round beginning, the round system rear end sends a first response corresponding to the round beginning request to the game client, and the first response carries the round number.

Operation S34: The round system original front end generates an entrance uniform resource locator (URL) of a game at a web front end.

The web front end is a web client, and the web client is generally a browser. After receiving the first response returned by the round system rear end, the round system original front end may parse the first response to obtain the round number, and generate a game address according to the round number, a game identification parameter of the game, and the like. The game address may be an entrance URL of the game on a browser. That is, the browser may open, according to the URL, a page of playing the game with the first user.

Operation S35: The round system original front end shares the entrance URL to a sharing component.

Herein, the sharing component is a component that is set on the round system original front end and that is formed by interfaces between the round system original front end and other social application clients on the first terminal. Messages between the round system original front end and other social application clients on the game client may be transmitted by using the sharing component. The social application client may be a client of an application such as WeChat, Microblog, and Space.

Herein, the round system original front end may further display an interface icon of a social application on the first web page in response to the first operation. The round system original front end obtains a second operation of the first user on the interface icon of the social application, and the second operation is an operation of selecting the social application. For example, as shown in FIG. 3-2(B), a floating box 322 is displayed on the first web page. Interface icons of various social applications, such as an interface icon 3221 "Battle with QQ friends" of the QQ application and an interface icon 3222 "Battle with WeChat friends" of the WeChat application, are displayed in the floating box. The first user clicks "Battle with WeChat friends", and the round system original front end obtains a second operation that the first user selects the WeChat application.

Herein, after obtaining the second operation that the first user selects the WeChat application, the round system original front end shares the entrance URL to a WeChat interface between the round system original front end and a WeChat application client in the sharing component.

Operation S36: The sharing component shares the entrance URL to a friend in a social application.

Herein, after receiving the entrance URL, the WeChat interface in the sharing component sends the entrance URL to a corresponding social application client, that is, the WeChat application client. After receiving the game address sent by the round system original front end by using a corresponding interface, the social application client may generate an instant messaging message according to the game address, and the instant messaging message carries the game address.

Herein, after the social application client receives the entrance URL, a display interface of the first terminal jumps from a page shown in FIG. 3-2(B) to a page shown in FIG. 3-2(C). The page shown in FIG. 3-2(C) is a friend list page provided by a social application client. The first user performs a selection operation (e.g., an operation of clicking a column 323 in which a second user is in, as shown in FIG. 3-2(C)) on the second user on the friend list page provided by the social application client, and the first terminal displays a floating box 324 of the instant messaging message in friend list page, as shown in FIG. 3-2(D). The first user clicks a "Share" virtual key 3241, and then the social application client sends, according to the second user selected by the first user from the friend list page provided by the social application client, the instant messaging message to a second terminal by using a social platform, and the second terminal corresponds to the second user.

Herein, the social platform corresponds to a social application server, and the social application client may send both the instant messaging message and user information of the second user on the social platform to the social platform.

Operation S37: A social platform sends a sharing message to a second user.

Herein, the sharing message may be the instant messaging message. After receiving the instant messaging message sent by the social application client of the first terminal and the user information of the second user on the social platform, the social platform may directly send the instant messaging message to the second user, and the second user corresponds to the second terminal.

Operation S38: The social platform sends a sharing success message to the sharing component.

Herein, after sending the instant messaging message to the second user, the social platform may send the sharing success message to the social application client of the first terminal. After receiving the sharing success message, the social application client sends the sharing success message to the WeChat interface between the round system original front end and the WeChat application client in the sharing component.

Operation S39: The sharing component forwards the sharing success message to the round system original front end.

Herein, after receiving the sharing success message, the WeChat interface between the round system original front end and the WeChat application client in the sharing component sends the sharing success message to the round system original front end.

Operation S310: The round system original front end waits for the friend to enter the URL to start a round.

Herein, after the round system original front end receives the sharing success message, the first terminal may jump to a waiting page 331 shown in FIG. 3-3(A) and wait for the friend to enter the URL to start a round.

Herein, after the social platform sends the instant messaging message to the second user, operations S38 and S39 are not performed. In this case, after operation S37, the first terminal automatically jumps to the waiting page 331 shown in FIG. 3-3(A) and waits for the friend to enter the URL to start a round.

Operation S311: The second user enters a web page by clicking the sharing message.

Figures 3, 4:
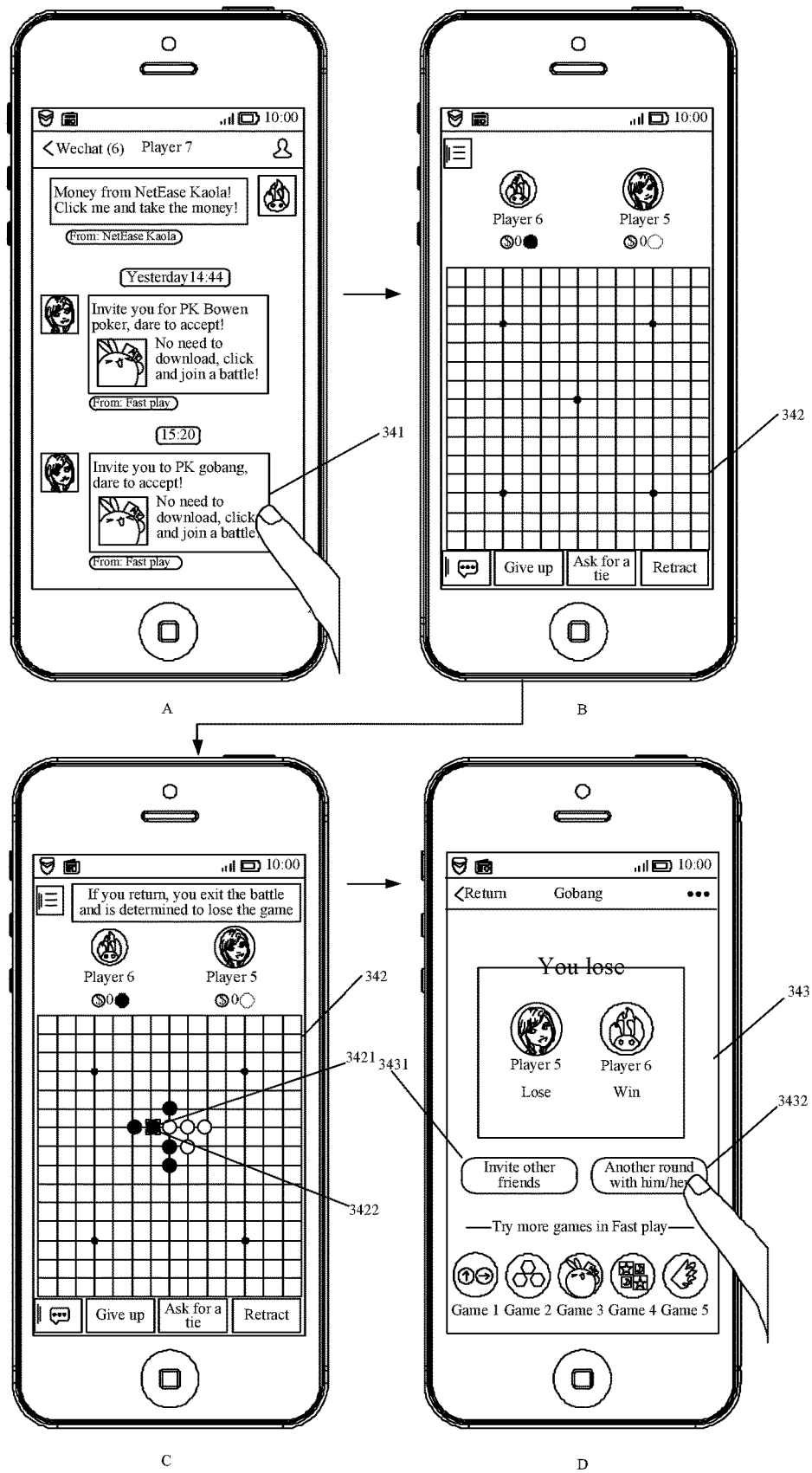

Herein, after receiving the instant messaging message, the second terminal displays the instant messaging message on an instant messaging page with the first user that is provided by the social application client of the second terminal. For example, as shown in FIG. 3-4(A), the page is the instant messaging page of the second user and the first user. The second user clicks the instant messaging message 341, and then second terminal jumps from a page shown in FIG. 3-4(A) to a web page 342 shown in FIG. 3-4(B).

Herein, the second user clicks the instant messaging message. In this way, the second terminal sends the game address carried in the instant messaging message to the game server, and obtains a second game resource corresponding to the game address from the game server. The second terminal loads the second game resource to obtain a second web page, and the second web page is a web page 342 of starting the game by the second user shown in FIG. 3-4(B).

Herein, if the game requires user login, after obtaining the second game resource corresponding to the game address, the second terminal may determine, according to the second game resource, that the second user needs to log in to the game. Then, the second terminal may display a login authorization page of the social application. After the second user is authorized to log in, the second terminal may use user information of the second user in the social application as a game user name to log in to the game, and then the second terminal loads the second game resource to obtain the second web page. In this case, a portrait and a name of the second user that are displayed on the second web page are a portrait and a name of the second user on the WeChat platform. If the game does not require user login or the second user is not authorized to log in, the second terminal may directly load the second game resource to obtain the second web page. The portrait and the name of the second user presented on the second web page are a portrait and a name by default. In this case, the game server automatically locates a game user name to the second user.

Operation S312: A round system web front end extracts a round number from a page parameter.

Herein, the round system web front end is a web client installed on the second terminal. Because the second web page is a web page corresponding to the round number, the web front end may extract the round number from the page parameter of the displayed second web page.

Operation S313: The round system web front end sends a game acceptance notification to the round system rear end.

Herein, when displaying the second web page, the web front end automatically returns the game acceptance notification to the round system rear end. The game acceptance notification carries the round number, and the game server is notified that a game corresponding to the round number is accepted by the second user.

Operation S314: The round system rear end sends a round starting notification to the round system original front end.

Operation S315: The round system rear end sends the round starting notification to the round system web front end.

Herein, after receiving the game acceptance notification, the round system rear end learns that the second user accepts an invitation of the first user for the game. In this case, the round system rear end separately sends the round starting notification to the first user and the second user, to instruct the first user and the second user to start the game.

Herein, the round system original front end on the first terminal receives the game starting notification sent by the game server, and the game starting notification is used for notifying the first user that the second user already accepts the invitation for the game. When receiving the game starting notification, the round system original front end on the first terminal obtains a game resource that the first user may use to start the game, loads the game resource to obtain a third web page, and displays the third web page. For example, a display interface of the round system original front end on the first terminal may jump from the waiting page 331 shown in FIG. 3-3(A) to the third web page 332 shown in FIG. 3-3(B).

Herein, a resource on the third web page is cached in the round system original front end. Therefore, when receiving the game starting notification, the round system original front end may directly obtain the game resource that the first user may use to start the game from the cache, load the game resource to obtain the third web page, and display the third web page. Alternatively, a resource on the third web page is not cached in the round system original front end. Therefore, when receiving the game starting notification, the round system original front end may send a resource request to the round system rear end, obtain the game resource that the first user may use to start the game from the round system rear end, load the game resource to obtain the third web page, and display the third web page.

Operation S316: The round system original front end sends a game operation instruction to the round system rear end.

Herein, the first user enters the third web page 332 shown in FIG. B of FIG. 3-3. Because when the first user is running the game, a game user name of the first user already exists in the round system rear end, after the first user performs a game operation, the round system original front end obtains the game operation and generates the game operation instruction, and sends the game operation instruction to the game server by using the game user name of the first user. In this way, the round system rear end obtains the game operation instruction of the first user. For example, assuming that first user plays black, and the second user plays white, after the first user performs an operation of placing a black stone at a first location, the round system original front end sends the game operation instruction to the round system rear end, and the game operation instruction carries information that the first user places the black stone at the first location.

Operation S317: The round system web front end sends the game operation instruction to the round system rear end.

Herein, the second user enters a second web page 342 shown in FIG. B of FIG. 3-4. The second user also has a corresponding game user name in the game server. Therefore, after the second user performs the game operation, the round system web front end obtains the game operation and generates the game operation instruction, and sends the game operation instruction to the game server by using the game user name of the second user. In this way, the round system rear end obtains the game operation instruction of the second user.

Operation S318: The round system rear end performs game instruction and state delivery on the round system original front end.

Herein, after obtaining the game operation instruction of the second user, the round system rear end generates a game instruction and delivers the game instruction to the round system original front end. The round system original front end displays the game operation instruction of the second user on the third web page, so that the first user sees an operation of the second user and plans a next game operation of the first user according to the operation of the second user.

Operation S319: The round system rear end performs game instruction and state delivery on the round system web front end.

Herein, after obtaining the game operation instruction of the first user, the round system rear end generates a game instruction and delivers the game instruction to the round system web front end. The round system web front end displays the game operation instruction of the second user on the second web page, so that the second user sees an operation of the first user and plans a next game operation of the second user according to the operation of the first user. For example, the game operation instruction of the first user carries the information that the first user places the black stone at the first location. The round system rear end delivers the game instruction to the round system web front end, and the round system web front end displays on the second web page 342 a state of displaying the black stone 3421 at the first location 3422, as shown in FIG. 3-4(C).

Herein, operations S316 to S319 do not have a sequence.

Herein, in operation S35 and operation S36, a method for obtaining the game address by the social application client on the first terminal is: sending, by the game client, the game address to the social application client by using an interface. In another embodiment of this application, an interface with another social application client is not set on the game client. Therefore, the method for obtaining the game address by the social application client on the first terminal may alternatively be: obtaining, by the game client, the game address according to the first response, and displaying the game address on the first web page; obtaining a copying operation of the first user on the game address on the first web page, and copying the game address to a cache in response to the copying operation; and receiving an obtaining operation of the first user on the game address, and obtaining the game address from the cache in response to the obtaining operation.

Herein, the game client obtains the game address, that is, a URL link, according to the first response and may display the game address, that is, the URL link, on the first web page. The first user may perform the copying operation on the game address, and the first terminal may copy the game address to the cache in response to the copying operation. Then, the first user may control the first terminal to exit a game page provided by the game client and enter a friend list page provided by a social client. Then the first user selects the second user from the friend list page provided by the social application client and enters an instant messaging page between the first user and the second user that is provided by the social application client. The first user performs a pasting operation on the instant messaging page. In this way, the social application client receives the obtaining operation of the first user on the game address, and obtains the game address from the cache in response to the obtaining operation. The first user clicks a "Send" virtual key on the instant messaging page, so as to send the game address, as an instant messaging message, to the second user on the instant messaging page between the first user and the second user by using a social platform.

Herein, after the obtaining a game address according to the first response, the method further includes: generating, according to the game address, an identifier for representing the game address. The identifier may be used for representing a two dimensional code of the game address, and the like. In this way, the game client can display the two dimensional code for representing the game address or a picture including the two dimensional code on the first web page. The instant messaging message sent to the second user by using the social platform carries the two dimensional code for representing the game address. That is, that the first terminal sends the game address to the second terminal includes: sending the identifier for representing the game address to the second terminal.

Herein, after determining that the game of the first user and the second user ends, the game server performs operations S318 and S319 and notifies the first user and the second user of a result of the game, so as to present a settlement page on the first terminal and the second terminal. For example, if the second user loses, the game server sends a game defeat notification to the round system web front end of the second terminal, and the round system web front end displays a defeat page 343 shown in FIG. 3-4(D).

Herein, after a round of the game, the first terminal and the second terminal display settlement pages, for example, the defeat page 343 on the second terminal shown in FIG. 3-4(D). An "Invite other friends" icon 3431 and an "Another round with him/her" icon 3432 are displayed on the defeat page, and the second user may click the "Another round with him/her" icon to initiate an invitation for another round. In this case, the second terminal may jump to a waiting page 351 shown in FIG. 3-5(A), the first terminal displays a floating box 361 on a settlement page shown in FIG. 3-6(A), and the first user clicks an "Accept an invitation" icon 3611. After detecting that the first user clicks the "Accept an invitation" icon 3611, the first terminal sends a round acceptation notification to the game server. The game server performs operations S314 and S315, to separately send the round starting notification to the first terminal and the second terminal. The first terminal receives the round starting notification and jumps from a battle invitation page shown in FIG. 3-6(A) to a game starting page 362 shown in FIG. 3-6(B). The second terminal receives the round starting notification and jumps from the waiting page 351 shown in FIG. 3-5(A) to a game starting page 352 shown in FIG. 3-5(B). In this way, the first user and the second user can start a new round of the game. Certainly, the second user may alternatively click the "Invite other friends" icon 3431 to initiate an invitation to other users, and the other users may not be game users. In this case, for a process from initiating an invitation by the second user to starting and including out the game, refer to operation S31 to operation S319. Certainly, the first user may alternatively initiate a new round on the settlement page.

Herein, the first user and the second user may interact with each other by using phrases and stickers, bringing more fun to the battle process. For example, a message key 371 is displayed on a game page shown in FIG. 3-7(A). In a game process, the first user wants to interact with the second user by using phrases or stickers, and then the first user may click the message key. In this way, as shown in FIG. 3-7(B) and (C), a "Messages" option 372 and a "Stickers" option 373 pop up at a lower part of the game page. The first user clicks message content "Hi, nice to meet you" 3721 in a message option, and then the first terminal sends the message content "Hi, nice to meet you" to the second terminal by using the game server. The first terminal displays the text of "Hi, nice to meet you" 3723 below the portrait 3722 of the first user on the game page, as shown in FIG. 3-7(D).

An embodiment may provide a cross-platform game battle method shown in FIG. 4 from a user perspective. The cross-platform game battle method includes:

Operation S401: A first user shares a game.

Herein, the first user is a game player A shown in FIG. 4. As shown in FIG. 3-2(A), the first user clicks a "PK with friends" virtual key 321 to share the game.

Operation S402: The first user selects a social application.

Herein, after the first user clicks the "PK with friends" virtual key 321 to share the game, a first terminal jumps to a page shown in FIG. 3-2(B). The first user clicks an interface icon 3222 "Battle with WeChat friends" of the WeChat application to select the WeChat application.

Operation S403: The first user selects a friend.

Herein, after the first user clicks the interface icon 3222 of the WeChat application to select the social application, the first terminal jumps to a friend list page shown in FIG. 3-2(C). The first user clicks a column 323 in which a second user is and that is on the friend list page, to select the friend, the second user.

Operation S404: The first user determines sharing.

Herein, as shown in FIG. 3-2(C), after the first user performs the selection operation on the second user on the friend list page provided by the social application client, the first terminal displays a floating box of the instant messaging message on the friend list page, as shown in FIG. 3-2(D), and the first user clicks a "Share" virtual key 3241 to determine sharing to the second user. The first terminal sends a sharing message to the second user by using a social application platform.

Operation S405: A second user receives the invitation message.

Herein, the second user is a social application user B shown in FIG. 4, and the first terminal sends the sharing message to the second user by using the social application platform. As shown in FIG. 3-3(A), the second user receives the sharing message, that is, the invitation message.

Operation S406: The second user clicks a link.

Herein, as shown in FIG. 3-4(A), the second user clicks the link of the invitation message, and the second terminal sends a game address carried in the instant messaging message to a game server, and obtains a game resource corresponding to the game address from the game server.

Operation S407: Authorize login of the second user.

Herein, in order for the second user to log in to a game, the second terminal may display a login authorization page of the social application. After the second user is authorized to log in, the second terminal may use user information of the second user in the social application as a game user name to log in to the game, and then the second terminal loads a game resource corresponding to the game address to obtain a second web page 342 shown in FIG. B of FIG. 3-4. In this case, a portrait and a name of the second user that are displayed on the second web page are a portrait and a name of the second user on the WeChat platform.

Operation S408: The first user and the second user start a battle.

Herein, the first user and the second user may start a game battle. Refer to operation S316 to operation S319 for the process.

In an exemplary embodiment, the first user may send the game address across platforms to a friend in the social application by using an interface between a game client and a social application client, to carry out a real-time game battle, or may copy and paste, across platforms to a social application client, the game address obtained from the game client and send the game address to a friend in the social application to carry out a real-time game battle. Based on a web technology, the game may run at the game client and the social application client, implementing running of a same game at clients of different platforms. The first user may invite a friend of the first user on a social application platform for a real-time battle by using an account linked to different social platforms. This is not limited by geographic conditions and network environments, greatly lowering a threshold for game experience of players.

Figures 3, 4, 5:
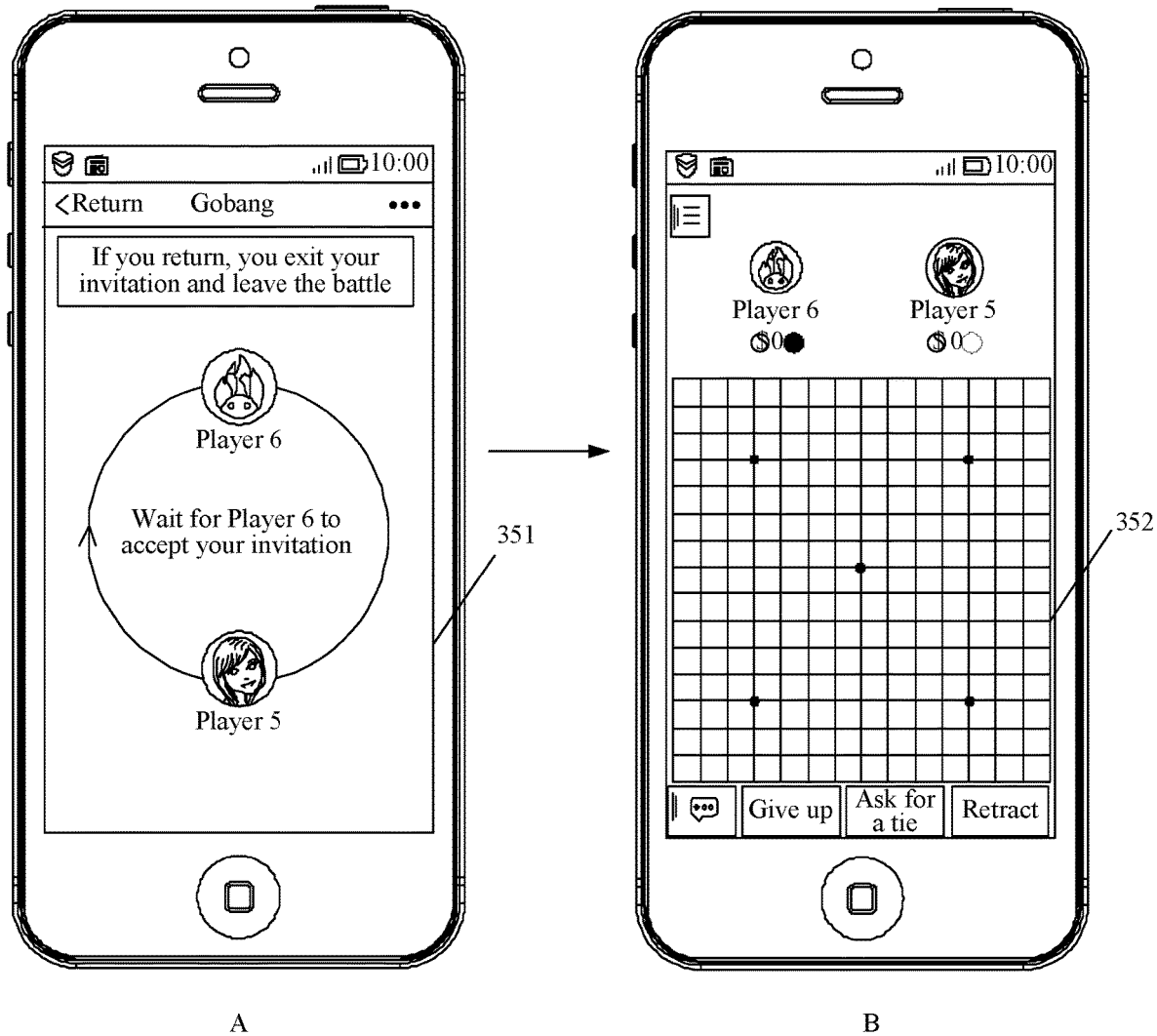

An exemplary embodiment provides a cross-platform game battle method. As shown in FIG. 5-1, the method includes:

Operation S501: A first terminal obtains a first operation that a first user begins a game on a first web page, and sends a first request to a game server in response to the first operation, the first request being used for requesting to begin the game.

Herein, the first web page may be a page shown in FIG. 3-2(A). The first user, as an initiator, clicks a "PK with friends" virtual key 321 on the first web page, and a game client on the first terminal detects that the user is about to invite a friend for a battle and then sends the first request to the game server.

Operation S502: The first terminal receives a first response returned by the game server, and obtains a game address according to the first response.

Herein, after receiving the first request, the game server carries out a round beginning service process and begins a game round for the first user. After getting ready for round beginning, the round system rear end returns the first response corresponding to the round beginning request to the game client, and the first response obtains the game address according to the first response.

S503: The first terminal generates and displays, according to the game address, an identifier for representing the game address.

Herein, the identifier for representing the game address includes a two dimensional code. That is, as shown in FIG. 5-2, the two dimensional code for representing the game address is displayed on the first terminal 51.

Operation S504: The second terminal obtains a scanning operation of the second user, and in response to the scanning operation, scans the identifier for representing the game address displayed on the first terminal, to obtain the game address.

Herein, the second user may open an application having a scanning function on the second terminal to perform the scanning operation. In response to the scanning operation of the second user, as shown in FIG. 5-2, the second terminal 52 scans the two dimensional code that is used for representing the game address and that is displayed on the first terminal 51. After obtaining the two dimensional code for representing the game address by means of scanning, the second terminal parsing the two dimensional code to obtain the game address.

Operation S505: The second terminal sends a second request to the game server, where the second request carries the game address.

Herein, after obtaining the game address, the second terminal may display the two dimensional code for representing the game address. The second user may click the two dimensional code, and then the second terminal parses the two dimensional code, to obtain the game address, and sends the second request including the game address to the game server. The second request is used for requesting the game server to return a second game resource that corresponds to the game address and that the second user needs to start the game.

Operation S506: The second terminal receives a second response returned by the game server, where the second response carries the second game resource.

Operation S507: The second terminal loads the second game resource to obtain a second web page, and displays the second web page.

Herein, the second web page is a web page that the second user starts the game, as shown in FIG. B of FIG. 3-4.

Operation S508: The second terminal sends a game acceptance notification to a game server.

Herein, when displaying the second web page, the second terminal automatically returns the game acceptance notification to the game server, and the game acceptance notification is used for notifying the game server that the game is accepted by the second user.

Operation S509: The game server separately sends a game starting notification to the first terminal and the second terminal after receiving the game acceptance notification.

Herein, after receiving the game acceptance notification, the game server learns that the second user accepts an invitation of the first user for the game. In this case, the game server separately sends the round starting notification to the first user and the second user, to instruct the first user and the second user to start the game.

Herein, after the first user and the second user start the game, refer to operations S316 to S319 for specific game playing.

In an exemplary embodiment, after the first user begins the game and obtains the game address from the game server, the first terminal may display an identifier such as the two dimensional code for representing the game address, and the identifier is obtained by means of scanning by a second terminal of a second user other than game users. After obtaining the game address, the second terminal may play the game with the first user by using the game server.

The first user may invite any second terminal having a scanning function to obtain the game address by means of scanning to carry out a real-time game battle, greatly lowering a threshold for game experience of players.

Based on the foregoing embodiments, an exemplary embodiment provides a cross-platform game battle apparatus. Units included in the cross-platform game battle apparatus and modules included in the units may all be implemented by using a processor in the apparatus or certainly, may be implemented by using a specific logic circuit. In a process of specific embodiments, the processor may be a central processing unit (CPU), a microprocessor (MPU), a digital signal processor (DSP), or a field programmable gate array (FPGA).

Figures 3, 4, 5, 6:
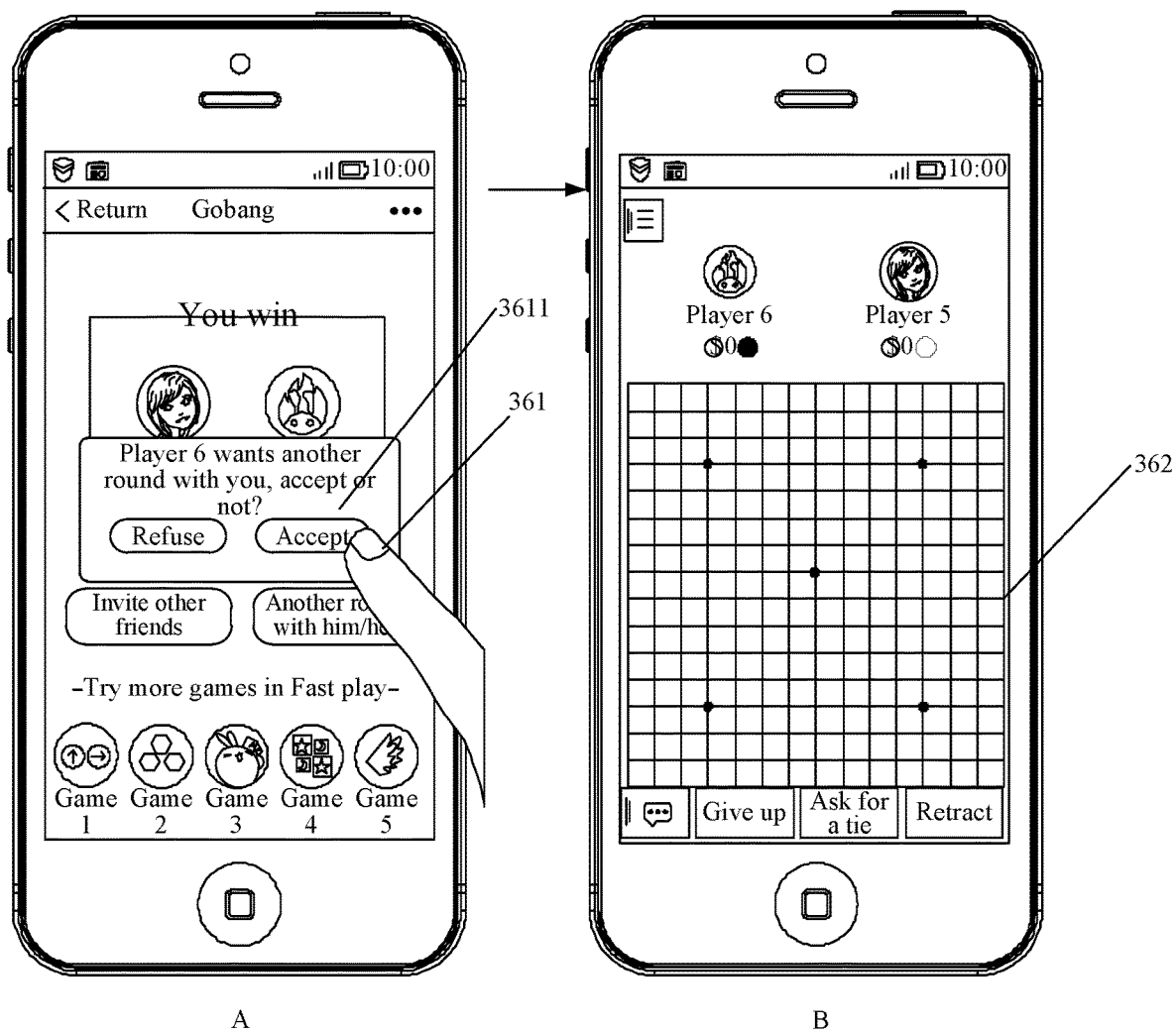

FIG. 6 is a schematic diagram of a composition of a cross-platform game battle apparatus according to an exemplary embodiment. As shown in FIG. 6, the apparatus includes an operation obtaining unit 601, a first sending unit 602, a receiving unit 603, an address obtaining unit 604, and a second sending unit 605.

The operation obtaining unit 601 is configured to obtain a first operation that a first user begins a game on a first web page.

The first sending unit 602 is configured to send a first request to a game server in response to the first operation, the first request being used for requesting to begin the game.

The receiving unit 603 is configured to receive a first response returned by the game server.

The address obtaining unit 604 is configured to obtain a game address according to the first response.

The second sending unit 605 is configured to send the game address to a second terminal, the game address being used for making the second terminal obtain a second web page, the second web page being a page of starting the game by a second user, and the second user corresponding to the second terminal; and the second user being a user other than game users on the first web page.

In another embodiment of this application, the first response carries the game address, and the address obtaining unit 604 is configured to parse the first response to obtain the game address; or the first response carries a round number of the game, and the address obtaining unit 604 is configured to: parse the first response to obtain the round number and generate the game address according to the round number and a game identification parameter.

In another embodiment of this application, the second sending unit 605 is configured to: obtain the game address, and generate an instant messaging message according to the game address, where the instant messaging message carries the game address; and send the instant messaging message to the second terminal according to the second user that is selected by the first user from a friend list page.

In another embodiment of this application, the address obtaining unit 604 is configured to: obtain the game address according to the first response, and display an interface icon of a social application on the first web page in response to the first operation; obtain a second operation of the first user on the interface icon of the social application, where the second operation is an operation of selecting the social application; and send the game address to the second sending unit 605 in response to the second operation; and the second sending unit 605 is configured to obtain the game address sent by the address obtaining unit 604.

In another embodiment of this application, the address obtaining unit 604 is configured to: obtain the game address according to the first response, and display the game address on the first web page; and obtain a copying operation of the first user on the game address on the first web page, and copy the game address to a cache in response to the copying operation; and the second sending unit 605 is configured to: receive an obtaining operation of the first user on the game address, and obtain the game address from the cache in response to the obtaining operation.

In another embodiment of this application, the apparatus further includes a generation unit, where the generation unit is configured to generate, according to the game address, an identifier for representing the game address; and the second sending unit 605 is configured to send the identifier for representing the game address to the second terminal.

In another embodiment of this application, the apparatus further includes a resource obtaining unit and a display unit, where the receiving unit 603 is configured to receive a game starting notification sent by the game server, where the game starting notification is used for notifying the first user that the second user already accepts an invitation for the game; the resource obtaining unit is configured to obtain, when the game starting notification is received, a first game resource that the first user needs to start the game; and the display unit is configured to load the first game resource to obtain a third web page, and displaying the third web page.

The foregoing descriptions of the apparatus embodiment are similar to the foregoing descriptions of method embodiments and have similar beneficial effects with those of the method embodiments, and therefore are not described in detail. Refer to descriptions in the method embodiments of this application for technical details undisclosed in the apparatus embodiments of this application.

Figures 3, 4, 5, 6, 7:
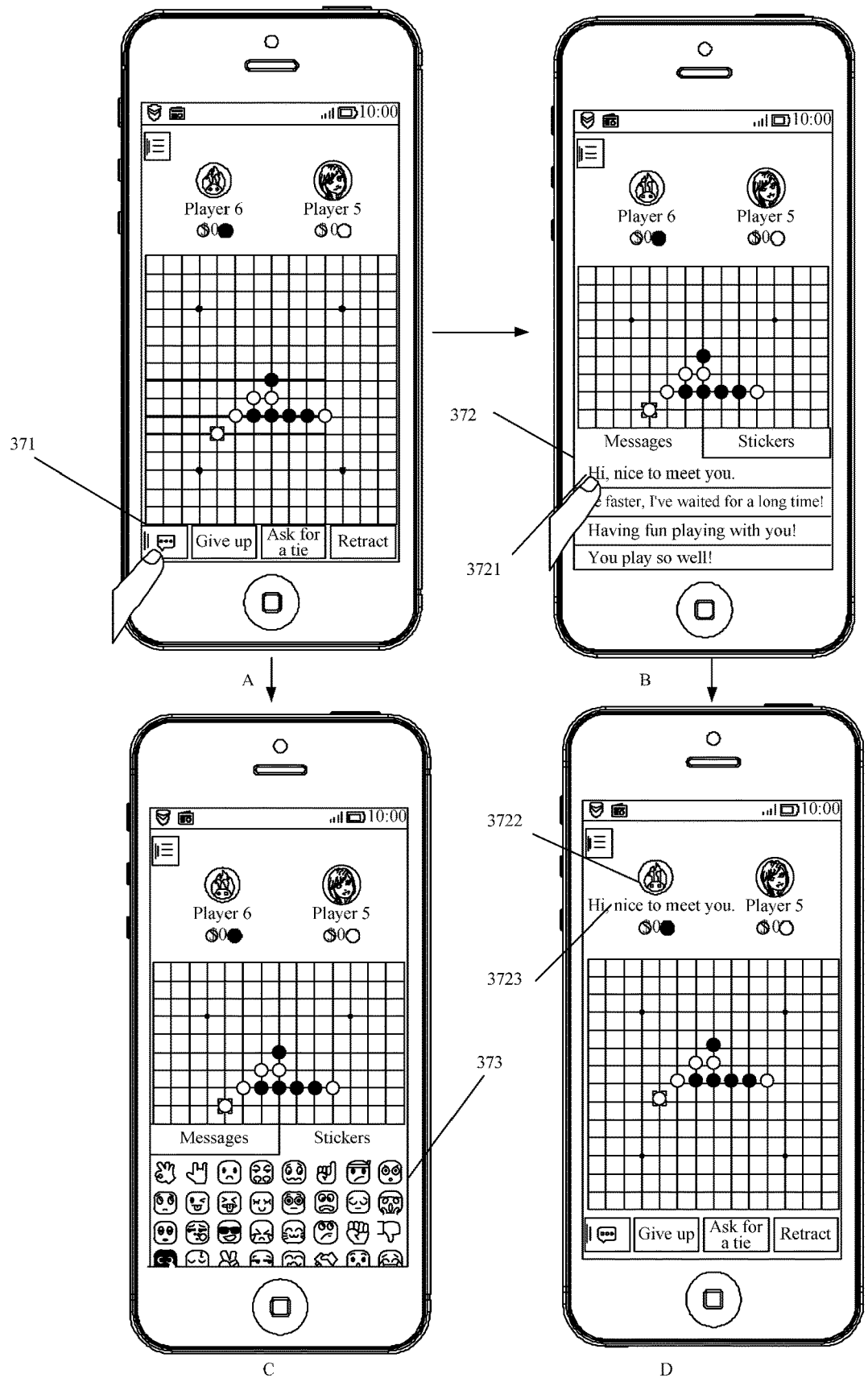
Figure 4:
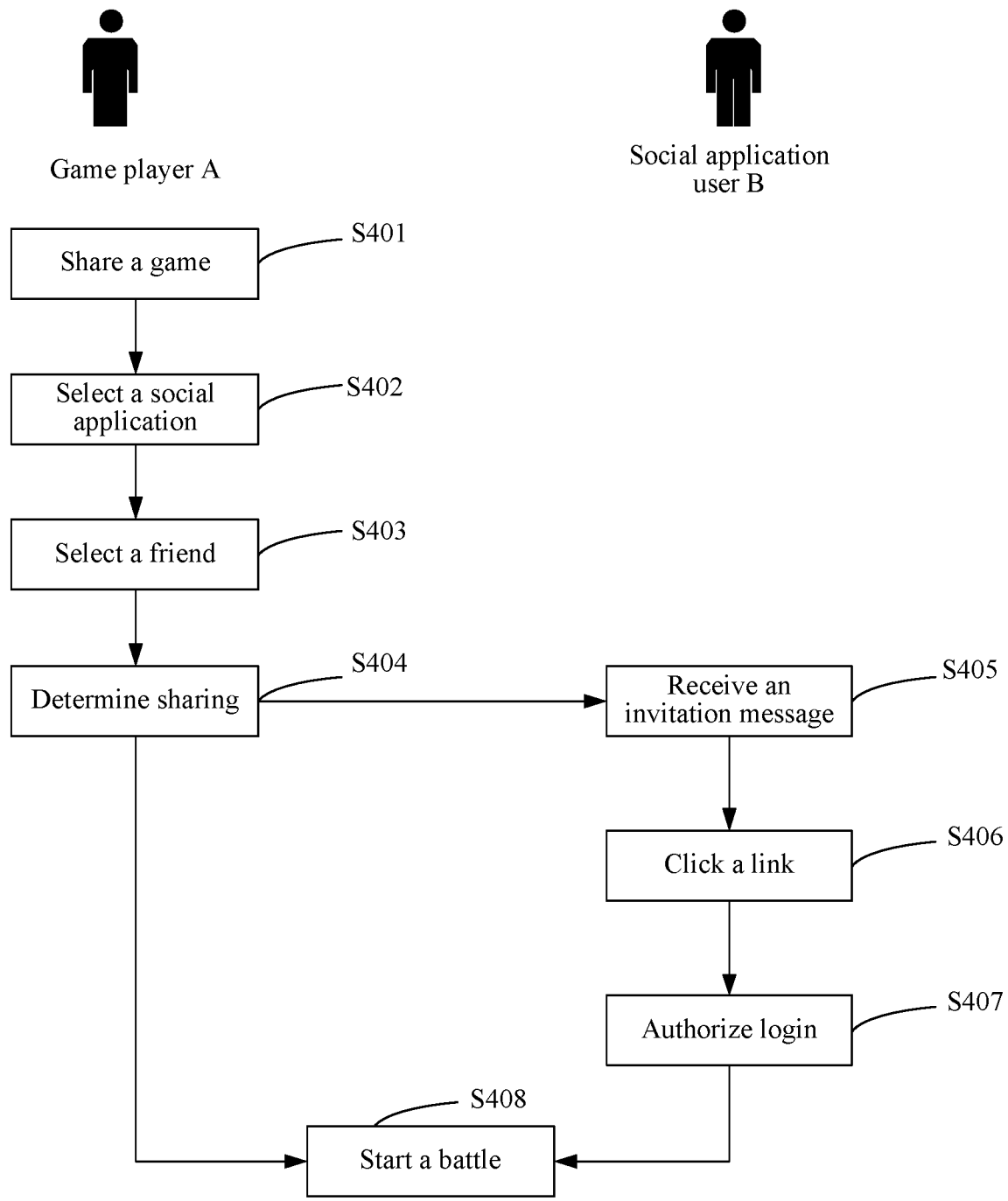
Figures 1, 5:
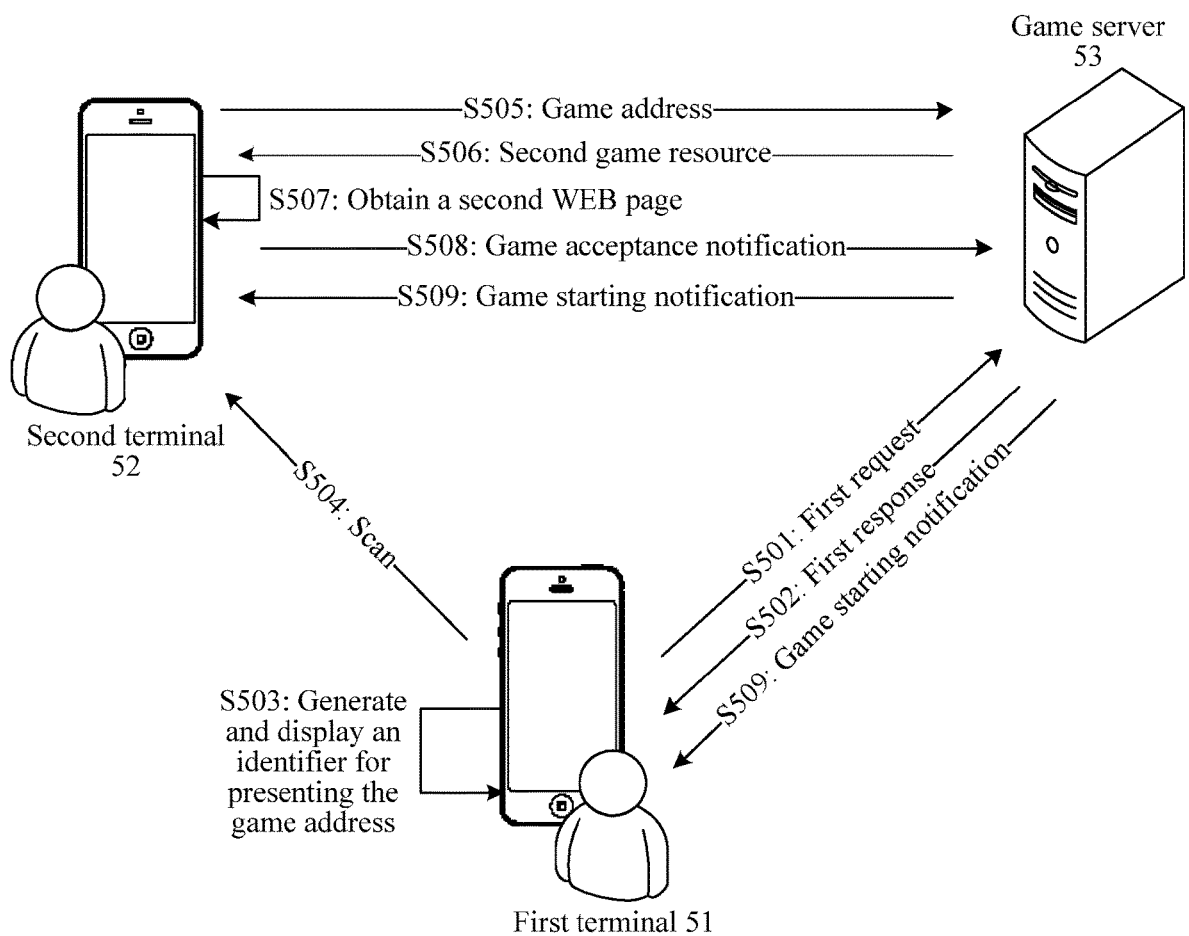
Figures 2, 5:
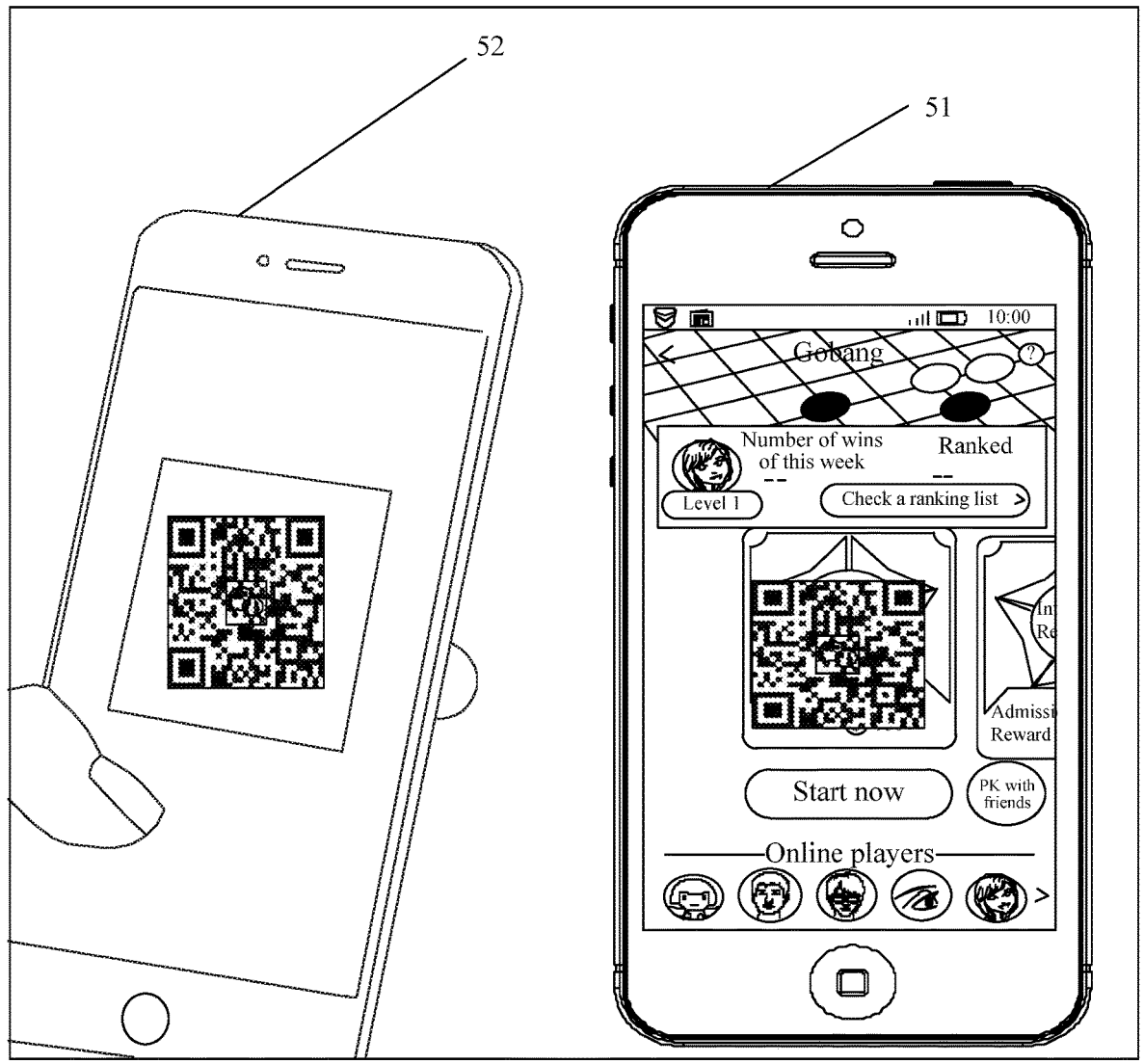
Figure 6:
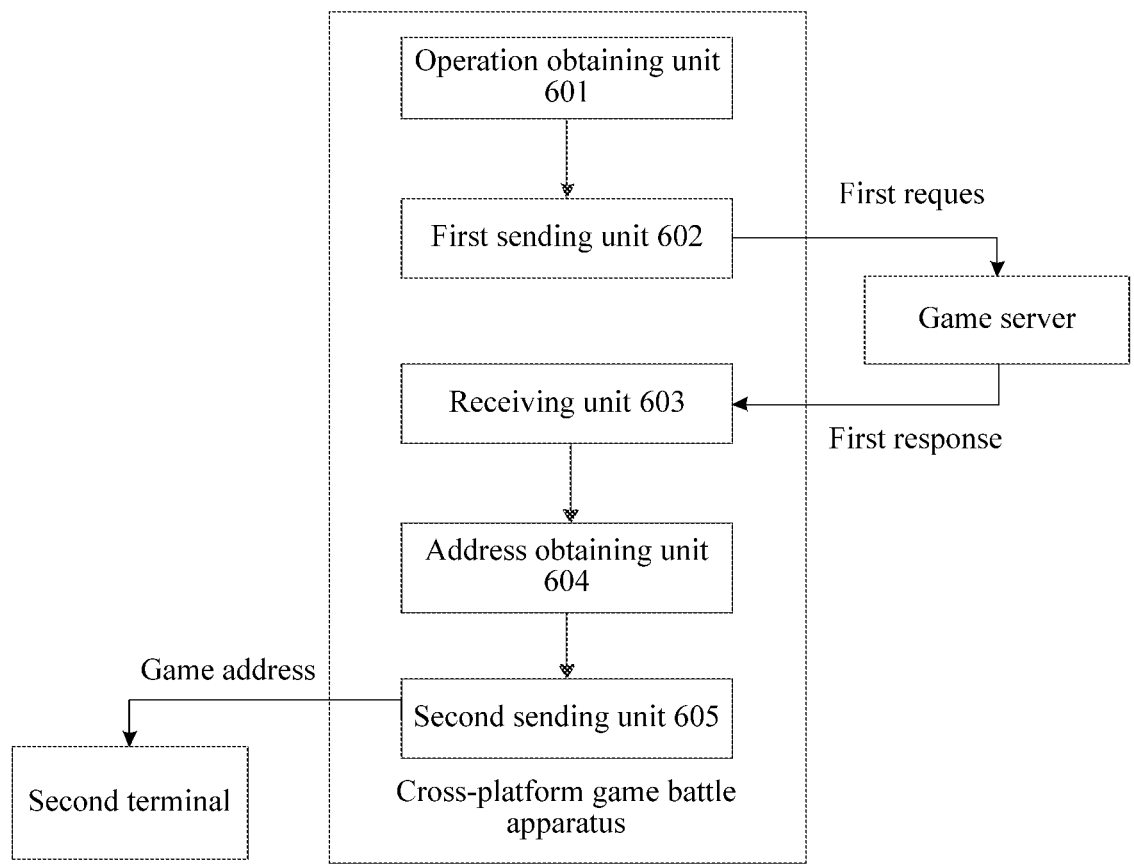
Figure 7:
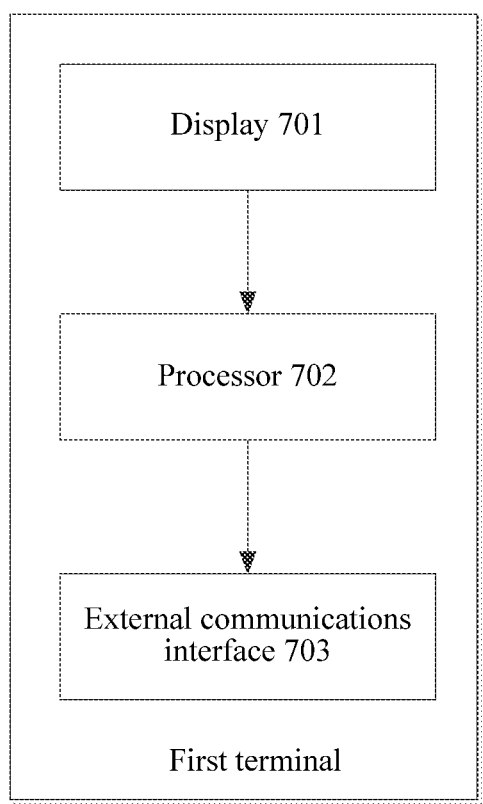

Based on the foregoing embodiments, an exemplary embodiment provides a first terminal. FIG. 7 is a schematic diagram of a composition of a first terminal according to an exemplary embodiment. As shown in FIG. 7, the first terminal includes a display 701, a processor 702, and an external communications interface 703.

The display 701 is configured to display a first web page.

The processor 702 is configured to: obtain a first operation that a first user begins a game on a first web page; in response to the first operation, control the external communications interface 703 to send a first request to a game server, the first request being used for requesting to begin the game; obtain a first response that is returned by the game server and that is received by the external communications interface 703; obtain a game address according to the first response; control the external communications interface 703 to send the game address to a second terminal, the game address being used for making the second terminal obtain a second web page, the second web page being a page of starting the game by a second user, and the second user corresponding to the second terminal; and the second user being a user other than game users on the first web page.

Based on the first terminal shown in FIG. 7, an exemplary embodiment further provides the composition of the first terminal. The first terminal further includes a non-volatile memory in addition to the display, the processor, and the external communications interface. The non-volatile memory is configured to store one or more computer readable instructions executed by the processor, and the one or more computer readable instructions include: an operation obtaining unit, a first sending unit, a receiving unit, an address obtaining unit, and a second sending unit. In another embodiment of this application, the one or more computer readable instructions include a generation unit, a resource obtaining unit, and a display unit. The processor may read the computer readable instructions stored in the non-volatile memory, to perform method operations described in the foregoing embodiments and implement functions of the apparatuses described in the foregoing embodiments.

The foregoing descriptions of the device embodiment are similar to the foregoing descriptions of method embodiments and have same beneficial effects as those of the method embodiments, and therefore are not described in detail. A person skilled in the art would refer to descriptions in the method embodiments of this application for technical details undisclosed in the device embodiments of this application.

Based on the foregoing embodiments, an exemplary embodiment provides a cross-platform game battle system. Referring to FIG. 5-1, the system includes a first terminal 51, a second terminal 52, and a game server 53.

The first terminal 51 is configured to: obtain a first operation that a first user begins a game on a first web page, and send a first request to a game server in response to the first operation, the first request being used for requesting to begin the game.

The game server 53 is configured to: receive the first request sent by the first terminal and return a first response to the first terminal.

The first terminal 51 is configured to: receive the first response returned by the game server and obtain a game address according to the first response; and generate and display, according to the game address, an identifier for representing the game address.

The second terminal 52 is configured to obtain a scanning operation of the second user, and in response to the scanning operation, scan the identifier for representing the game address displayed on the first terminal, to obtain the game address.

The second user is a user other than game users on the first web page.

The foregoing descriptions of the device embodiment are similar to the foregoing descriptions of method embodiments and have same beneficial effects as those of the method embodiments, and therefore are not described in detail. A person skilled in the art would refer to descriptions in the method embodiments of this application for technical details undisclosed in the device embodiments of this application.

It should be understood that "one embodiment" or "an embodiment" mentioned throughout the specification means that particular features, structures, or characteristics related to the embodiments are included in at least one embodiment of this application. Therefore, "one embodiment" or "an embodiment" appearing in the entire specification for multiple times is necessarily the same embodiment. In addition, these particular features, structures, or characteristics may be combined in one or more embodiments in any proper manner. It should be understood that in various embodiments of this application, an order of sequence numbers of the foregoing processes does not indicate an execution sequence, and execution sequences of the processes should be determined according to functions and internal logics thereof and should not impose any limitation on an implementation process of the embodiments of this application. The sequence numbers of the foregoing embodiments of this application are merely for description purpose but do not indicate the preference of the embodiments.

It should be noted that in this text, the terms "include", "comprise", and any variants thereof are intended to cover a non-exclusive inclusion. Therefore, a process, method, object, or apparatus that includes a series of elements not only includes such elements, but also includes other elements not specified expressly, or may include inherent elements of the process, method, object, or apparatus. Unless further limited, an element limited by a sentence "include a/an . . . " does not exclude other same elements existing in the process, method, object, or apparatus that includes the elements.

In the several embodiments provided in this application, it should be understood that the disclosed device and method may be implemented in other manners. The described device embodiments are merely exemplary. For example, the unit division is a merely logical function division and may be other division manners during actual implementation. For example, multiple units or components may be combined or integrated into another system, or some features may be ignored or not executed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The parts displayed as units may be or may not be physical units. That is, the units may be located in a same place, or may be distributed on multiple network units. Some or all of the units are selected according to actual requirements to achieve the objective of the solutions of the embodiments. In addition, the functional units in the embodiments of this application may be integrated into one processing unit, or each of the units may be used a unit alone, or two or more units may be integrated into one unit. The integrated units may be implemented in the form of hardware, or may be implemented in the form of a hardware and software functional unit.

A person of ordinary skill in the art may understand that all or some of the operations of the foregoing method embodiments may be implemented by using hardware relevant to a program instruction. The program may be stored in a computer readable storage medium. When being executed, the program performs operations of the foregoing method embodiments. The storage medium includes: various media capable of storing program code such as a mobile storage device, a read-only memory (ROM), a magnetic disk, or an optical disc. Alternatively, if the foregoing integrated units of this application are implemented in a form of software functional modules and are sold or used as independent products, the units may be stored in a computer readable storage medium. Based on such understanding, the technical solutions of the embodiments of this application essentially or the part contributing to the existing technology may be implemented in a form of a software product. The computer software product is stored in a storage medium and includes several instructions for instructing a computer device (which may be a personal computer, a server, a network device, or the like) to perform all or some of the methods in the embodiments of the present invention. The foregoing storage medium includes: any media that can store program code, such as a mobile storage device, a ROM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application should be subject to the protection scope of the claims.

What is claimed is:

1. A cross-platform game battle method performed by a first terminal, comprising:
    sending a first request to a game server in response to a first operation, with respect to a game, on a first web page;
    receiving a first response in response to the first request, parsing the first response to obtain a round number corresponding to a round of the game, and generating a game address according to the round number;
    generating, according to the game address, an identifier for representing the game address, wherein the identifier for representing the game address comprises a two dimensional code;
    sending the identifier for representing the game address to a second terminal, the game address being obtained and usable by the second terminal, upon clicking the two dimensional code included in the identifier displayed on the second terminal and parsing the two dimensional code by the second terminal, to obtain a second web page to start the round of the game;
    jumping to a waiting page to wait for the second terminal to start the round of the game by using the game address; and
    in response to receiving a game starting notification, the game starting notification indicating a start of the round of the game by the second terminal, jumping from the waiting page to a third web page to start the round of the game in association with the second terminal,
    the second terminal being on a platform that is different from a platform of the first web page.

2. The method according to claim 1, wherein the game address is generated further based on a game identification parameter.

3. The method according to claim 1, wherein the sending the game address comprises:
    obtaining, by a social application client of the first terminal, the game address;
    generating, by the social application client of the first terminal, an instant messaging message comprising the game address; and
    sending, by the social application client of the first terminal, the instant messaging message to the second terminal associated with a second user that is selected from a friend list page provided by the social application client.

4. The method according to claim 3, wherein the obtaining the game address according to the first response comprises:
    obtaining, by a game client of the first terminal, the game address according to the first response;
    displaying, by the game client of the first terminal, an interface icon of a social application on the first web page in response to the first operation;
    obtaining, by the game client of the first terminal, a second operation on the interface icon of the social application, wherein the second operation is an operation of selecting the social application; and
    sending, by the game client of the first terminal, the game address to the social application client corresponding to the social application in response to the second operation, and
    wherein the obtaining, by the social application client on the first terminal, the game address comprises: receiving, by the social application client on the first terminal, the game address sent by the game client.

5. The method according to claim 3, wherein the obtaining the game address according to the first response comprises:

obtaining, by a game client of the first terminal, the game address according to the first response, and displaying the game address on the first web page;

copying, by the first terminal, the game address to a cache in response to a copying operation on the game address on the first web page; and the obtaining, by the social application client of the first terminal, the game address comprises: obtaining, by the social application client, the game address from the cache in response to a user operation.

6. The method according to claim 1, further comprising:
in response to receiving the game starting notification, obtaining a first game resource and displaying the third web page based on the first game resource to start the round of the game.

7. A cross-platform game battle apparatus, comprising:
at least one memory configured to store computer program code; and
at least one processor configured to access the at least one memory and operate according to the computer program code, the computer program code including:
first sending code configured to cause the at least one processor to send a first request to a game server in response to a first operation, with respect to a game, on a first web page;
receiving code configured to cause the at least one processor to receive a first response in response to the first request;
address obtaining code configured to cause the at least one processor to parse the first response to obtain a round number corresponding to a round of the game, and generate a game address according to the round number;
generation code configured to cause the at least one processor to generate, according to the game address, an identifier for representing the game address, wherein the identifier for representing the game address comprises a two dimensional code;
second sending code configured to cause the at least one processor to send the identifier for representing the game address to a second terminal, the game address being obtained and usable by the second terminal, upon clicking the two dimensional code included in the identifier displayed on the second terminal and parsing the two dimensional code by the second terminal, to obtain a second web page to start the round of the game;
code configured to cause the at least one processor to jump to a waiting page to wait for the second terminal to start the round of the game by using the game address; and
code configured to cause the at least one processor to, in response to receiving a game starting notification, jump from the waiting page to a third web page to start the round of the game in association with the second terminal, the game starting notification indicating a start of the round of the game by the second terminal,
the second terminal being on a platform that is different from a platform of the first web page.

8. The apparatus according to claim 7, wherein the game address is generated further based on a game identification parameter.

9. The apparatus according to claim 7, wherein the second sending code further causes the at least one processor to: obtain the game address, generate an instant messaging message comprising the game address, and send the instant messaging message to the second terminal associated with a second user that is selected from a friend list page.

10. The apparatus according to claim 9, wherein
the address obtaining code further causes the at least one processor to: obtain the game address according to the first response, and display an interface icon of a social application on the first web page in response to the first operation; obtain a second operation on the interface icon of the social application, the second operation being an operation of selecting the social application; and send the game address in response to the second operation; and
the second sending code further causes the at least one processor to obtain the game address sent by the address obtaining code.

11. The apparatus according to claim 9, wherein
the address obtaining code further causes the at least one processor to: obtain the game address according to the first response, display the game address on the first web page, and copy the game address to a cache in response to a copying operation on the game address on the first web page, and
the second sending code further causes the at least one processor to obtain the game address from the cache in response to a user operation.

12. The apparatus according to claim 7, wherein
the computer program code further includes:
resource obtaining code configured to cause the at least one processor to, in response to receiving the game starting notification, obtain a first game resource, and
display code configured to cause the at least one processor to display the third web page based on the first game resource to start the game.

13. A first terminal, comprising:
a processor;
a non-volatile memory;
a display; and
an external communications interface,
the display being configured to display a first web page,
the non-volatile memory being configured to store one or more computer readable instructions executed by the processor,
the processor being configured to read the one or more computer readable instructions stored in the non-volatile memory, to perform:
sending a first request to a game server in response to a first operation, with respect to a game, on the first web page;
receiving a first response in response to the first request, parsing the first response to obtain a round number corresponding to a round of the game, and generating a game address according to the round number;
generating, according to the game address, an identifier for representing the game address, wherein the identifier for representing the game address comprises a two dimensional code:
sending the identifier for representing the game address to a second terminal, the game address being obtained and usable by the second terminal, upon clicking the two dimensional code included in the identifier displayed on the second terminal and parsing the two dimensional code by the second terminal, to obtain a second web page to start the round of the game;
jumping to a waiting page to wait for the second terminal to start the round of the game by using the game address; and in response to receiving a game starting notification, the game starting notification indicating a start of the round of the game by the second terminal, jumping from the waiting page to a third web page to start the round of the game in association with the second terminal, the second terminal being on a platform that is different from a platform of the first web page.

* * * * *